United States Patent [19]

Damon et al.

[11] Patent Number: 4,610,278

[45] Date of Patent: Sep. 9, 1986

[54] VARIABLE LEAD LENGTH ASSEMBLY

[75] Inventors: Billy L. Damon; Andrew J. Kliethermes, both of St. Louis County, Mo.

[73] Assignee: Emerson Electric Co., St. Louis, Mo.

[21] Appl. No.: 769,561

[22] Filed: Aug. 26, 1985

[51] Int. Cl.$^4$ ............................................. B21F 11/00
[52] U.S. Cl. .................................... 140/92.1; 29/605; 242/7.09
[58] Field of Search ................. 242/7.05 B, 7.09, 7.14; 83/175, 241, 247; 140/92.1; 29/605

[56] References Cited

U.S. PATENT DOCUMENTS

| | | | |
|---|---|---|---|
| 3,557,432 | 1/1971 | Pavesi | 140/92.1 |
| 3,672,040 | 6/1972 | Arnold | 140/92.1 |
| 3,857,172 | 12/1974 | George et al. | 242/7.05 B |
| 3,927,469 | 12/1975 | Dammar | 242/7.05 B |
| 4,217,937 | 8/1980 | Ache et al. | 140/92.1 |
| 4,396,042 | 8/1983 | Hamane et al. | 140/92.1 |
| 4,412,564 | 11/1983 | Hamane et al. | 140/92.1 |
| 4,457,347 | 7/1984 | Roth et al. | 140/92.1 |

*Primary Examiner*—Lowell A. Larson
*Attorney, Agent, or Firm*—Polster, Polster and Lucchesi

[57] ABSTRACT

In a coil winding machine, an adjustable wire cutoff assembly is slidably engageable with wire fed from the wire source of magnet wire intermediate said source and a coil winding form. The adjustable wire cutoff assembly is movable away from the coil winding form while wire is being fed from the winding source and is engaged by the wire cutoff assembly, thereby increasing the length of the lead extending from the form to the cutoff assembly over the length it would have if the cutoff assembly were not so moved. The position to which the adjustable wire cutoff assembly is moved can be preset so that leads of various lengths can readily be formed on the same coil winding machine. When the cutoff assembly is moved to the desired position, it is actuated to cut the wire to form a lead of predetermined length.

10 Claims, 3 Drawing Figures

VARIABLE LEAD LENGTH ASSEMBLY

BACKGROUND OF THE INVENTION

This invention relates to the manufacture of stator assemblies for dynamoelectric machines, and in particular to a machine for automating certain portions of the winding process in the manufacture of stator assemblies for such dynamoelectric machines. While the invention is described with particular emphasis for its use in conjunction with AC induction motors, those skilled in the art will recognize the wider applicabilities of the inventive principles disclosed hereinafter.

U.S. patent to Kieffer et al, U.S. Pat. No. 3,714,973 ('973) discloses a relatively high speed winding machine which can be used to form windings for a dynamoelectric machine. The winding machine disclosed in the '973 patent provides for improved motor production rates which are obtained relatively simply and inexpensively. The disclosure of that patent is incorporated herein by reference. An improvement to such a winding machine is shown in U.S. Pat. No. 3,913,629 to Kieffer, the disclosure of which is also incorporated herein by reference. The winding machines disclosed in the above-mentioned patents perform their job very well. However, it is known that various motors which can be wound on the same winding machine need leads (that is, the wire extending from the coil of the motor itself out to some control strip or box) of different lengths depending on the desired application. For example, a motor manufactured for use in one company's appliances may require lead lengths different from those manufactured for another company's appliances because of the different designs of the appliances involved. With the winding machines disclosed in the above-mentioned patents, these variable lead lengths were achieved by having the winding machine wind an extra turn around the coil. The operator would then unwind that extra turn and cut off the lead to the desired length. This process clearly reduced operator efficiency and involved waste of the wire.

One of the objects of the present invention is to provide an improved coil winding machine which reduces the waste involved in prior systems.

Another object of this invention is to provide a system which automates the process of providing the extra length for the lead, therefore reducing operator time.

Another object of this invention is to provide an improved coil winding machine which is capable of providing a variety of lead lengths.

Another object of this invention is to provide an improved coil winding machine which can vary the lengths of both starting and finishing leads.

Other objects of this invention will be in part apparent and in part pointed out hereinafter.

SUMMARY OF THE INVENTION

In accordance with this invention, generally stated, an improvement for a winding machine for winding electric motor coils, which machine has at least one coil winding form and means for winding magnet wire around the form to create an electric motor coil, includes an adjustable wire cutoff assembly slidingly engageable with the wire fed from the winding apparatus intermediate the winding apparatus and the coil winding form. Means are also included for moving the adjustable wire cutoff assembly away from the coil winding form while the wire is being fed through the winding means and is engaged by the wire cutoff assembly, thereby increasing the length of the lead extending from the form to the cutoff assembly over the length it would have if the cutoff assembly were not so moved. Means for presetting the position to which the moving means moves the adjustable wire cutoff assembly so that leads of various lengths can readily be formed on the same coil winding machine are also included. The adjustable wire cutoff assembly is actuated once the assembly reaches the preset position to cut the wire to form a lead of the predetermined length.

BRIEF DESCRIPTION OF THE DRAWINGS

In the drawings.

Similar reference characters indicate similar parts throughout the several views of the drawings.

DESCRIPTION OF THE PREFERRED EMBODIMENT

Figure 1:
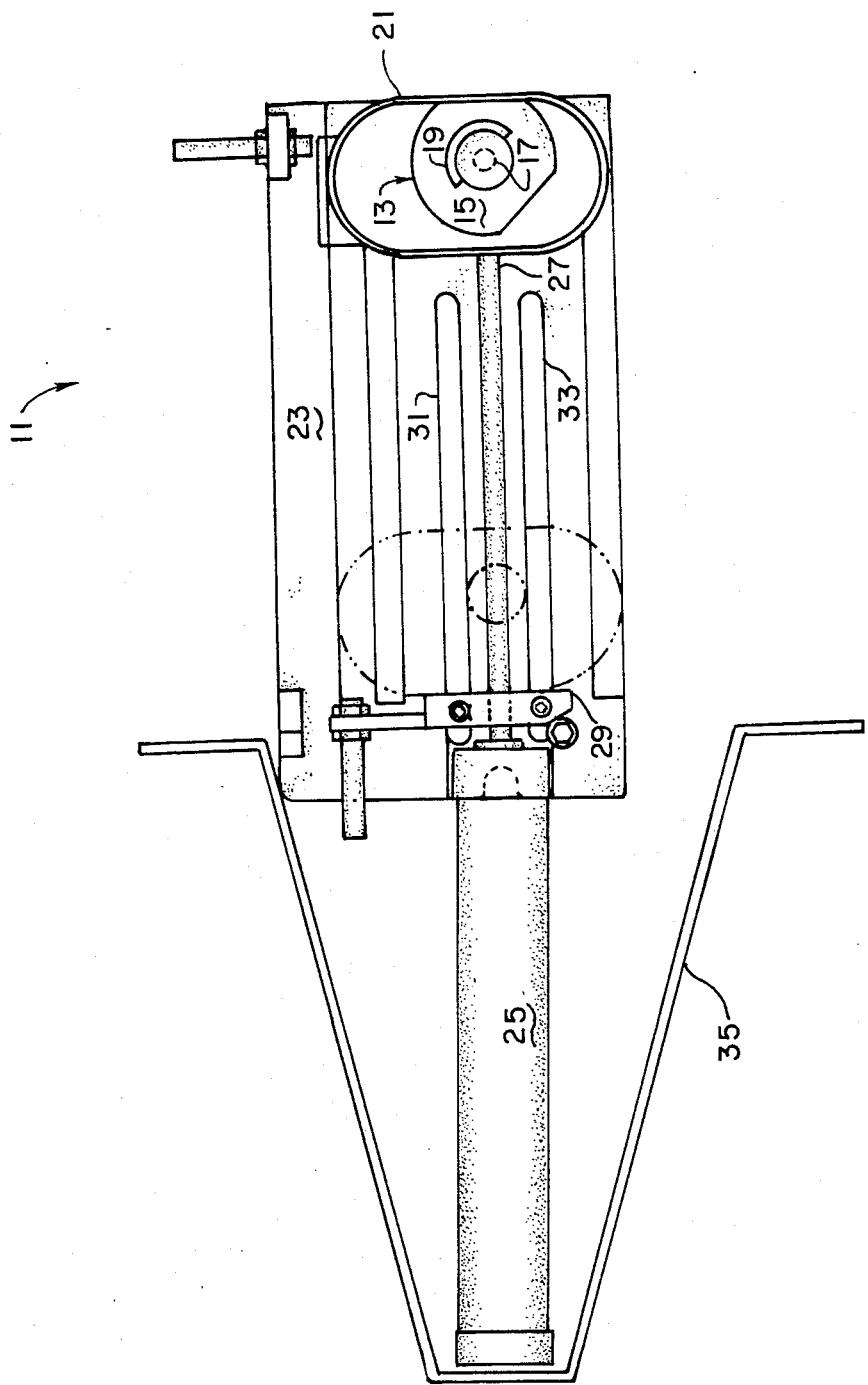
FIG. 1 is a top plan of the cutoff assembly of the present invention.

Turning now to the drawings, there is shown in FIG. 1 an adjustable wire cutoff assembly 11 of the present invention. Assembly 11 includes a wire cutoff mechanism 13, including a relatively flat mounting surface 15 out of which perpendicularly extends a pin or post 17. Disposed semicircularly around pin 17 is a slanted cutting surface 19 which, in combination with an upper portion of cutting mechanism 13 shown in FIG. 2, results at the desired time in the cutting of the wire being wound. Cutting mechanism 13 is disposed inside a guard 21, which is slidingly mounted upon a base 23. A cylinder 25, having a piston rod 27 secured to guard 21, is provided to move the guard and cutting mechanism from the position shown in solid lines in FIG. 1 to the position shown in phantom. Cylinder 25 and the other cylinders described below can be pneumatically or hydraulically operated in the manner known in the art, and are controlled by a standard controller, not shown. When cylinder 25 is actuated to pull cutting mechanism 13 to the left as shown in FIG. 1, it moves or pulls the mechanism inside the guard to the left until the guard encounters a manually adjustable stop 29. Manually adjustable stop 29 rides in a pair of grooves 31 and 33 and can be placed anywhere along those grooves to provide a continuous variation in the amount by which cylinder 25 moves the cutting mechanism to the left. When stop 29 is in the desired position, it is secured in that position by means of threaded fasteners 45 or the like. Cylinder 25 is protected by a guard 35 which, like base member 23, is secured to a table 37 (FIG. 2) to which are also mounted the other elements of the present invention.

Figure 2:
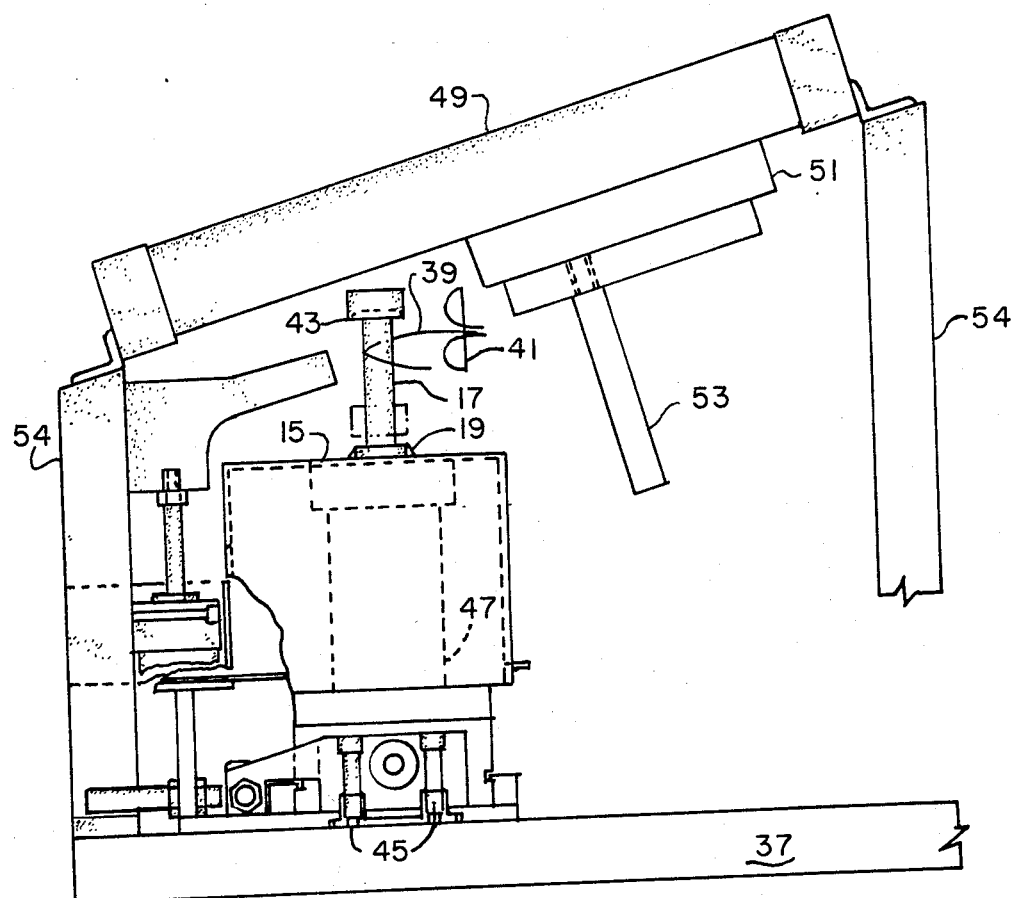
FIG. 2 is a side elevation of the apparatus of the present invention.

Turning to FIG. 2, pin 17 of cutting mechanism 13 is shown with a length of magnet wire 39 suitable for a coil of an electric motor passed therearound. Wire 39 is dispensed from a flier (or needle) 41 of conventional design, such as shown in the aforementioned U.S. patents. At its upper end, pin 17 includes a cutting head 43 which, in conjunction with cutting surface 19, cuts wire 39, as described below. Since cutting surface 19 does not extend all the way around pin 17, however, the wire is cut at one point and held by the cutting mechanism at another point, so that after the cutting operation, one end of the wire falls free while the other end (that still connected to flier 41) remains held in cutting mechanism 13.

When flier 41 has wound the desired number of turns in the coil of an electric motor, as described below and in the aforementioned U.S. patents, cylinders 47 forces pin 17 up into the path of wire 39 thereby resulting in the configuration shown in FIG. 2. The wire can then be cut at that point by movement of cutting head 43 into contact with cutting surface 19. This is accomplished by a cylinder 47, which drives pin 17 from the position shown in FIG. 2 to a position in which the wire is cut. In so doing, cutting surface 19 remains stationary, while cutting head 43 is moved downwardly by pin 17. If a longer lead is desired than would be achieved by leaving cutting mechanism 13 in the position shown in FIG. 1, cylinder 25 is actuated to move the cutting mechanism to the desired position before cutting head 43 is lowered to sever the wire.

In some instances, it may be desired to provide a start lead for the next coil which is even longer than that achieved by moving the cutting mechanism 13 to the position shown in phantom in FIG. 1. For this reason, the present invention includes a cylinder 49 having a movable member 51 suspended therebeneath which carries a pin 53. Once the cutting mechanism has severed the wire, cylinder 49 can be actuated in the conventional manner to move pin 53 at an acute angle with respect to the horizontal down toward the left to slidingly engage the portion of the wire held between the cutting mechanism and flier 41. Cylinder 49 is securely mounted by a pair of supports 54 to table 37.

Figure 3:
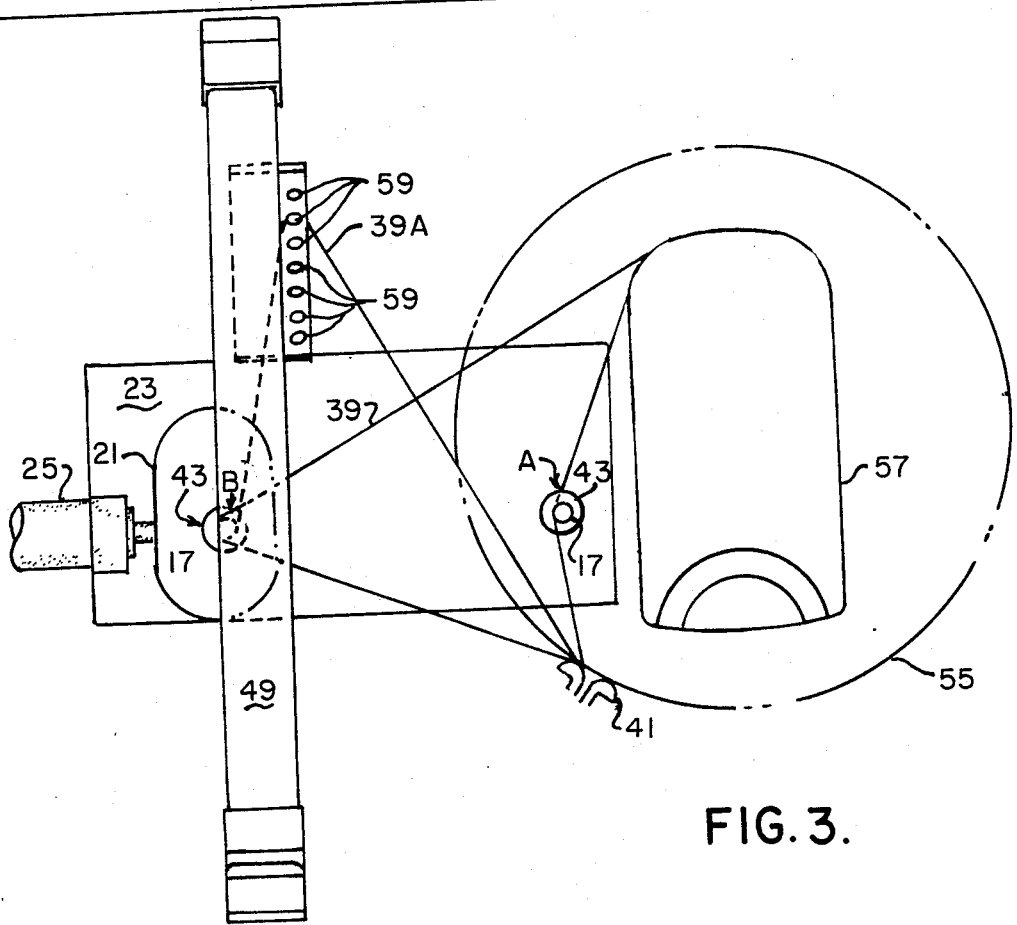
FIG. 3 is a diagrammatic view looking down from the top on the apparatus of the present invention used in conjunction with a coil winding machine.

The operation of the present invention is best illustrated in FIG. 3. As is known, in a conventional coil winding machine, flier 41 follows a predetermined path 55 around a coil winding form 57. Of course, various coil winding forms 57 are used for a given motor. As the flier travels in its path around form 57, the wire conforms to the outline of the form. The number of revolutions flier 41 makes around form 57 corresponds to the number of turns in that particular coil. Before the present invention, the lead length achieved after the desired number of turns were wound was limited basically to the distance between form 57 and a point labelled A on cutting head 43. If a longer end lead was desired, it was necessary to wind an extra turn around the form and then manually unwind that turn and cut the lead to the desired length. A similar situation existed with the start lead for the next coil which, prior to the present invention, was the same length as the distance from point A to flier 41. With the present invention, however, once the desired number of turns are wound on form 47, cylinder 25 is actuated by the controller to move the cutting mechanism to the leftmost position shown on FIG. 3. Cutting head 43 is then lowered by cylinder 47 to cut wire 39 at the point labeled "B" on FIG. 3 to provide a much longer finish lead length. Since the position to which cylinder 25 moves the cutting mechanism can be adjusted over a range of values, it can be seen that the length of the finish lead from point B to the winding form can be set at any predetermined length as desired within that range.

Once cutting head 43 ls lowered to sever wire 39, the end of wire 39 between the cutting mechanism and, flier 41 is held in place. If it is desired to have a start lead for the next coil which is longer than the distance from point B to the flier, the controller is programmed to actuate cylinder 49. Actuation of cylinder 49 causes pin 53 to move downwardly and to the left, as shown in FIG. 2, which catches the portion of wire 39 between cutting mechanism 13 and flier 41. This pulls additional wire out of flier 41 and increases the length of the subsequent start lead, as shown in FIG. 3. For convenience, this increased length lead is labeled 39A. A number of receptacles 59 are provided for pin 53 so that the length of starting lead 39A can be adjusted even further. Note that cylinders 25 and 49 operate at right angles to each other to maximize the possible length of the start lead.

After cylinder 49 is actuated to pull the desired amount of wire out of flier 41, cylinder 49 is de-actuated thereby moving pin 53 to its home position shown in FIG. 2. Cutting mechanism 43 is allowed to move back to its home position shown in FIG. 1, and pin 17 and cutting head 43 are retracted by cylinder 47 to remove them from the path of wire 39 as it is wound around form 57, or some similar form, for the next coil.

Numerous variations, within the scope of the appended claims, will be apparent to those skilled in the art in light of the foregoing description and accompanying drawings.

These variations are merely illustrative.

What is claimed is:

1. In a machine for winding electric motor coils, said machine having at least one coil winding form and means for winding magnet wire around the form to create an electric motor coil, the improvement comprising:

an adjustable wire cutoff assembly slidingly engageable with the wire fed from the winding means intermediate the winding means and the coil winding form;

means for moving the adjustable wire cutoff assembly away from the coil winding form while wire is being fed through the winding means and is engaged by the wire cutoff assembly, thereby increasing the length of the lead extending from the form to the cutoff assembly over the length it would have if the cutoff assembly were not so moved;

means for presetting the position to which the moving means moves the adjustable wire cutoff assembly so that leads of various lengths can readily be formed on the same coil winding machine; and means for actuating the adjustable wire cutoff assembly once the assembly reaches said preset position to cut the wire to form a lead of predetermined length.

2. The improvement as set forth in claim 1 wherein the winding means follows a predetermined path around the coil winding form and wherein the adjustable wire cutoff assembly is disposed inside said path when it first engages the wire and is disposed outside said path when actuated by the actuating means to cut the wire.

3. The improvement as set forth in claim 1 wherein the moving means moves the cutoff assembly generally along a straight line, further including start lead means moveable at an angle with respect to said straight line for pulling the wire intermediate the cutoff assembly and the winding means to increase the amount of wire disposed between said cutoff assembly and the winding means, which amount of wire forms the start lead for the next coil wound by the machine.

4. The improvement as set forth in claim 3 wherein the start lead means moves generally along its longitudinal axis and said axis is substantially at right angles with respect to the straight line followed by the cutoff assembly.

5. The improvement as set forth in claim 3 wherein the start lead means further includes means for presetting the start lead length.

6. The improvement as set forth in claim 5 wherein the start lead presetting means includes a pin for engaging the wire and a plurality of receptacles for said pin disposed along the direction of motion of the start lead pin, whereby the start lead length is preset by placing the pin in the desired one of the plurality of receptacles.

7. The improvement as set forth in claim 1 wherein the cutoff assembly includes means for gripping a portion of the wire extending to the winding means, further including means for pulling wire from the winding means while the wire is gripped by the cutoff assembly to increase the amount of wire between the cutoff assembly and the winding means.

8. The improvement as set forth in claim 7 wherein the pulling means includes a pin slidingly engageable with the wire intermediate the cutoff assembly and the winding means and further includes means for moving said pin along a path at a substantially non-zero angle with respect to a straight line between the cutoff assembly and the winding means to pull additional wire from the winding means.

9. The improvement as set forth in claim 8 wherein the path of the pin makes a non-zero acute angle with a horizontal line.

10. The improvement as set forth in claim 1 wherein the cutoff assembly is moveable along a predetermined path and wherein the presetting means includes a manually adjustable stop disposed at an operator selected position along said predetermined path.

* * * * *